(12) United States Patent
Isokawa et al.

(10) Patent No.: US 9,135,538 B2
(45) Date of Patent: Sep. 15, 2015

(54) IMAGE FORMING APPARATUS WITH MEASURING SECTION WHICH MEASURES A HEIGHT POSITION OF A SHEET SURFACE

(71) Applicant: Konica Minolta, Inc., Tokyo (JP)

(72) Inventors: Hiroshi Isokawa, Hino (JP); Mitsunori Nakamura, Tama (JP)

(73) Assignee: KONICA MINOLTA, INC. (JP)

( * ) Notice: Subject to any disclaimer, the term of this patent is extended or adjusted under 35 U.S.C. 154(b) by 0 days.

(21) Appl. No.: 14/227,359

(22) Filed: Mar. 27, 2014

(65) Prior Publication Data
US 2014/0307290 A1    Oct. 16, 2014

(30) Foreign Application Priority Data

Apr. 15, 2013  (JP) .................................. 2013-084693

(51) Int. Cl.
| | |
|---|---|
| H04N 1/60 | (2006.01) |
| H04N 1/23 | (2006.01) |
| H04N 1/00 | (2006.01) |
| G03G 15/00 | (2006.01) |
| G06K 15/02 | (2006.01) |

(52) U.S. Cl.
CPC ............ G06K 15/1867 (2013.01); G03G 15/00 (2013.01); G03G 15/5062 (2013.01); G03G 15/607 (2013.01); H04N 1/00023 (2013.01); H04N 1/00045 (2013.01); H04N 1/23 (2013.01); H04N 1/2323 (2013.01); H04N 1/605 (2013.01); H04N 1/6033 (2013.01); H04N 1/6044 (2013.01); H04N 1/6055 (2013.01)

(58) Field of Classification Search
None
See application file for complete search history.

(56) References Cited

U.S. PATENT DOCUMENTS

| | | | | |
|---|---|---|---|---|
| 6,557,961 | B2* | 5/2003 | Cheng et al. ...................... | 347/9 |
| 7,883,166 | B2* | 2/2011 | Kuwahara et al. ............... | 347/14 |
| 2010/0259755 | A1* | 10/2010 | Clark et al. ..................... | 356/402 |
| 2013/0164692 | A1* | 6/2013 | Kotoku et al. ................. | 430/325 |
| 2013/0201244 | A1* | 8/2013 | Benedicto et al. ............... | 347/19 |
| 2013/0258368 | A1* | 10/2013 | Shigemoto et al. ............. | 358/1.9 |
| 2014/0218434 | A1* | 8/2014 | Kosuge ........................... | 347/17 |

FOREIGN PATENT DOCUMENTS

| | | |
|---|---|---|
| JP | 2005257456 A | 9/2005 |
| JP | 2006035645 A | 2/2006 |

(Continued)

OTHER PUBLICATIONS

Japanese Notification of Reasons for Refusal corresponding to Application No. 2013-084693; Date of Mailing: Mar. 3, 2015, with English translation.

*Primary Examiner* — King Poon
*Assistant Examiner* — Vincent Peren
(74) *Attorney, Agent, or Firm* — Cantor Colburn LLP (57) ABSTRACT

An image forming apparatus includes: a measuring section which measures a height position of a surface of a sheet at a reading position at which a reference image for image quality adjustment is read; a control section which determines a planar region of the sheet according to the height position, and determines a forming position of the reference image within the planar region; an image forming section which forms the reference image at a position of a sheet corresponding to the forming position, the sheet being newly fed after determination of the forming position; and a reading section which reads the reference image at the reading position, wherein the control section adjusts image quality by using a read value obtained from the reference image by the reading section.

3 Claims, 10 Drawing Sheets

FOREIGN PATENT DOCUMENTS

| | | |
|---|---|---|
| JP | 2006309059 A | 11/2006 |
| JP | 2007304492 A | 11/2007 |
| JP | 200089697 A | 4/2008 |
| JP | 2010145605 A | 7/2010 |
| JP | 2010266432 A | 11/2010 |
| JP | 2012181555 A | 9/2012 |

* cited by examiner

IMAGE FORMING APPARATUS WITH MEASURING SECTION WHICH MEASURES A HEIGHT POSITION OF A SHEET SURFACE

The present invention claims priority under 35 U.S.C. §119 to Japanese Application No. 2013084693 filed Apr. 15, 2013, the entire content of which is incorporated herein by reference.

BACKGROUND OF THE INVENTION

1. Field of the Invention

The present invention relates to an image forming apparatus and a method for reading a reference image.

2. Description of Related Art

An electrophotographic image forming apparatus forms a reference image for image quality adjustment on a sheet, changes an image forming condition etc. according to read values obtained by reading the reference image, and adjusts image quality so that it becomes constant.

In the case that curl, waving and/or fluttering of the sheet occur when reading the reference image, a height position of a surface of the sheet sometimes fluctuates. When fluctuation of the height position is large, the read values vary and accuracy of reading is lowered, and accordingly image quality adjustment cannot be performed accurately.

In the case that the reference image is formed in a region where there are few curl and/or waving, accuracy of reading can be prevented from lowering due to fluctuation of the height position of the sheet surface. However, because a usual line sensor used for image reading cannot detect the height position of the sheet surface, the reference image has heretofore been formed also in a region where fluctuation of the height position caused by curl and/or waving of the sheet is large. In order to detect the height position of the sheet surface, a special sensor (for example, see Japanese Patent Application Laid-open Nos. 2007-304492, 2010-266432, and 2012-181555) is necessary.

Meanwhile, in order to suppress fluctuation of the height position of the sheet surface caused by fluttering of the sheet, there have been measures such as providing a guide plate below the sheet so that the guide plate makes a gap through which the sheet can pass narrower at a reading position (for example, see Japanese Patent Application Laid-open No. 2010-145605) and making the sheet contact with a reading surface of the line sensor which reads the reference image.

However, when the gap through which the sheet can pass is made narrower, the resistance of the sheet becomes larger during conveyance. Accordingly, conveyance performance at a constant speed is lowered, and variation of the read values becomes large also in this case.

Moreover, when the sheet contacts with the reading surface of the line sensor, the reading surface is easily soiled. Especially, when an anti-smudge coating layer is provided on the sheet, there is a case that the coating layer comes unstuck due to friction against the reading surface and such condition is read as vertical stripe noises, and accordingly accuracy of reading is significantly lowered.

SUMMARY OF THE INVENTION

An object of the present invention is to improve accuracy of reading of a reference image at the time of adjusting image quality.

In order to achieve the above object, according to a first aspect of a preferred embodiment of the present invention, there is provided an image forming apparatus including: a measuring section which measures a height position of a surface of a sheet at a reading position at which a reference image for image quality adjustment is read; a control section which determines a planar region of the sheet according to the height position, and determines a forming position of the reference image within the planar region; an image forming section which forms the reference image at a position of a sheet corresponding to the forming position, the sheet being newly fed after determination of the forming position; and a reading section which reads the reference image at the reading position, wherein the control section adjusts image quality by using a read value obtained from the reference image by the reading section.

According to a second aspect of the preferred embodiment of the present invention, there is provided an image forming apparatus including: an image forming section which forms a reference image for image quality adjustment on a sheet; a reading section which reads the reference image; a measuring section which measures a height position of a surface of the sheet, on which the reference image is formed, at a reading position of the reading section; and a control section which determines a planar region of the sheet, on which the reference image is formed, according to the height position, and adjusts image quality by using a read value of the reference image formed within the planar region, the read value being obtained by the reading section.

According to a third aspect of the preferred embodiment of the present invention, there is provided a method for reading a reference image for image quality adjustment, the method including the steps of: measuring a height position of a surface of a sheet at a reading position at which the reference image is read; determining a planar region of the sheet according to the height position, and determines a forming position of the reference image within the planar region; forming the reference image at a position of a sheet corresponding to the forming position, the sheet being newly fed after determination of the forming position; and reading the reference image at the reading position.

According to a fourth aspect of the preferred embodiment of the present invention, there is provided a method for reading a reference image for image quality adjustment, the method including the steps of: forming the reference image on a sheet; measuring a height position of a surface of the sheet, on which the reference image is formed, at a reading position at which the reference image is read; and determining a planar region of the sheet, on which the reference image is formed, according to the height position, reading the reference image to obtain a read value; and selecting and obtaining a read value of the reference image formed within the planar region, the read value being obtained by reading the reference image.

BRIEF DESCRIPTION OF THE DRAWINGS

The present invention will become more fully understood from the detailed description given hereinbelow and the appended drawings, and thus are not intended as a definition of the limits of the present invention, and wherein.

PREFERRED EMBODIMENT OF THE PRESENT INVENTION

Hereinafter, embodiments of an image forming apparatus and a method for reading a reference image of the present invention will be described with reference to the drawings.

Figure 1:
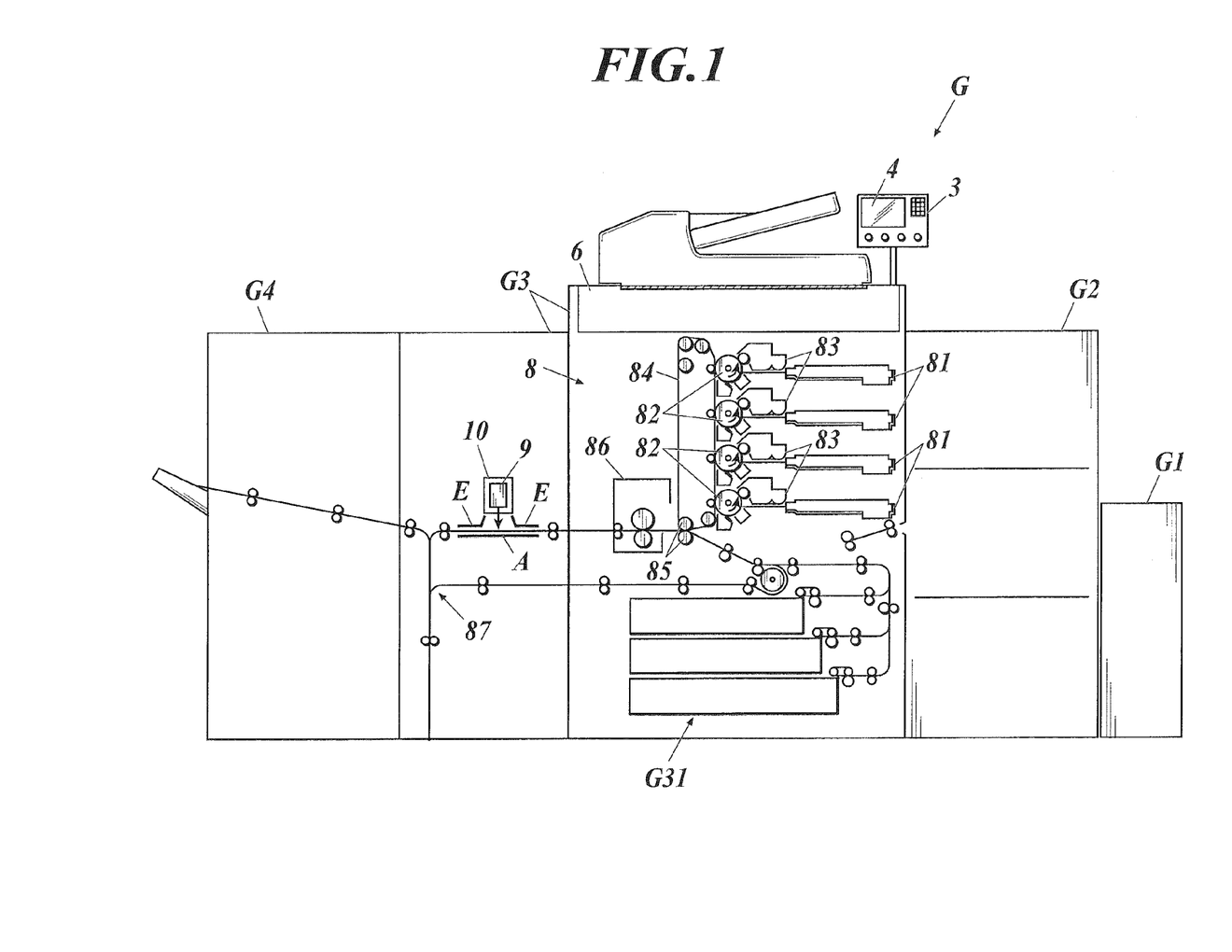
FIG. 1 is a schematic configuration diagram of an image forming apparatus according to this embodiment.

FIG. 1 illustrates a schematic configuration of an image forming apparatus G according to this embodiment.

As illustrated in FIG. 1, the image forming apparatus G includes a print controller G1, a feeding unit G2, a main body unit G3 and a finishing device G4.

The print controller G1 receives Page Description Language (PDL) data from a computer terminal on a network, and performs rasterizing processing to the PDL data to generate image data of a bitmap format.

The print controller G1 generates image data for each of colors of cyan (C), magenta (M), yellow (Y) and black (K) to output the image data to the main body unit G3.

The feeding unit G2 is equipped with a plurality of feeding trays each having a high capacity.

The feeding unit G2 conveys each sheet to the main body unit G3 from the feeding tray instructed by the main body unit G3.

The main body unit G3 includes an operation section 3, a display section 4, a scanner 6, an image forming section 8, feeding trays 31, a reading section 9, a measuring section 10, and so on.

The main body unit G3 causes the image forming section 8 to form an image on the sheet on the basis of the image data obtained by reading a document with the scanner 6 or the image data generated by the print controller G1. The main body unit G3 conveys the sheet on which the image has been formed to the finishing device G4.

The finishing device G4 performs finishing processing to the sheet which has been conveyed from the main body unit G3, and then discharges the sheet. As the finishing processing, there can be adopted stapling processing, punching processing, folding processing, bookbinding processing, etc., for example. The finishing processing is optional, and the finishing device G4 executes the finishing processing only when receiving a finishing instruction from the main body unit G3.

In the case that finishing is not executed, the finishing device G4 directly discharges the conveyed sheet.

Figure 2:
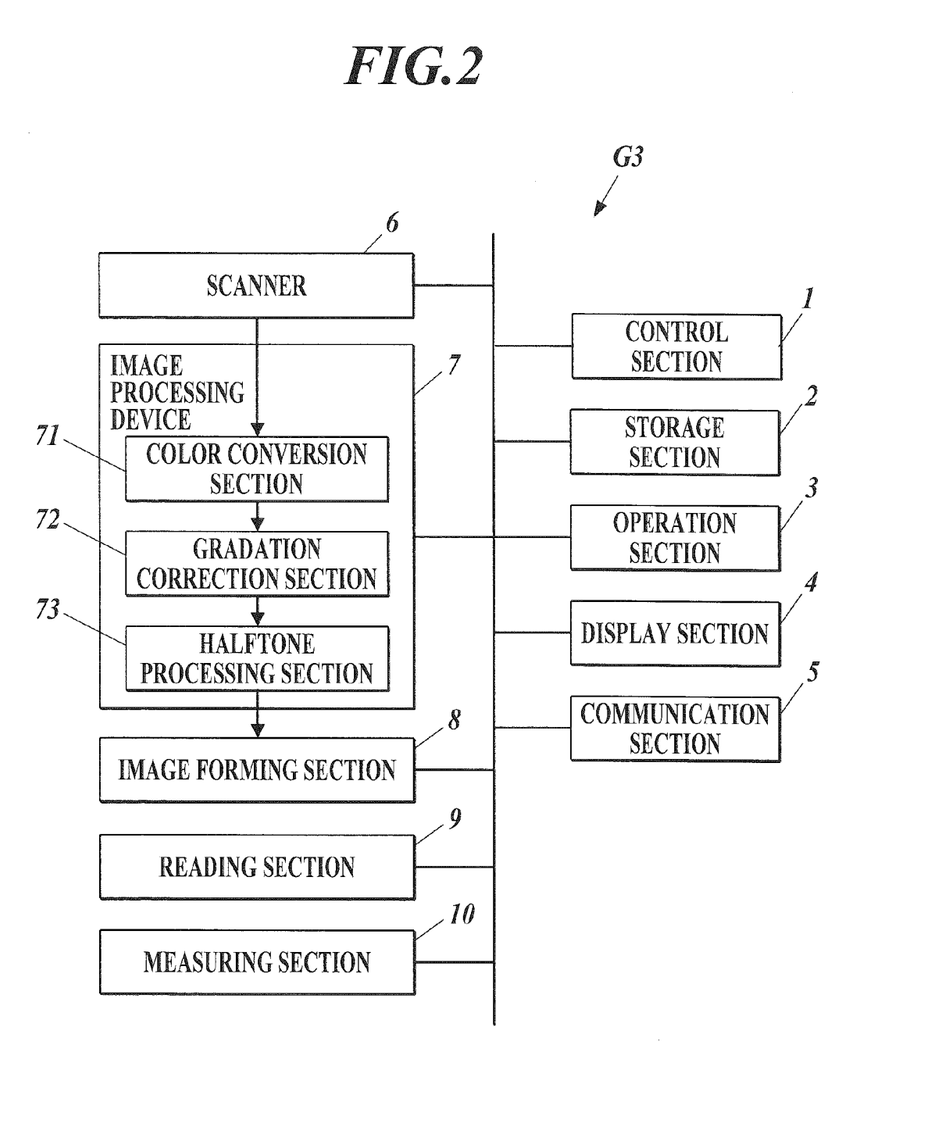
FIG. 2 is a functional block diagram of the image forming apparatus illustrated in FIG. 1.

FIG. 2 is a functional block diagram of the main body unit G3.

As illustrated in FIG. 2, the main body unit G3 is configured to include a control section 1, a storage section 2, the operation section 3, the display section 4, a communication section 5, the scanner 6, an image processing device 7, the image forming section 8, the reading section 9 and the measuring section 10.

The control section 1 includes a Central Processing Unit (CPU), Random Access Memory (RAM), and so on. The control section 1 reads out programs stored in the storage section 2, and controls the respective sections of the image forming apparatus G according to the programs.

For example, the control section 1 causes the feeding unit G2 or the feeding trays G31 to feed each sheet according to a job setting. The control section 1 also causes the image processing device 7 to execute correction and image processing to the image data, and causes the image forming section 8 to form an image. In the case that the job setting includes a finishing setting, the control section 1 instructs the finishing device G4 to perform finishing processing.

The control section 1 is capable of executing image quality adjustment at regular intervals or at an optional timing.

Specifically, the control section 1 causes the image forming section 8 to form a reference image for image quality adjustment, and causes the reading section 9 to read the reference image to obtain read values.

The control section 1 is capable of adjusting image quality so that it becomes constant by adjusting an image forming condition such as laser power of laser light emitted during exposure in the image forming section 8, a bias voltage applied to a developing roller at the time of developing, etc., according to the obtained read values.

The control section 1 is capable of adjusting image quality so that it becomes constant also by updating a Look Up Table (LUT) used in color conversion or gradation correction, according to the obtained read values. Incidentally, when updating the LUT, the control section 1 invalidates color conversion or gradation correction by the image processing device 7.

The storage section 2 stores programs, files, etc. which are readable by the control section 1. As the storage section 2, there can be used, for example, a storage medium such as a hard disk and a Read Only Memory (ROM).

The storage section 2 also stores pieces of image data of plural kinds of reference images.

The operation section 3 is equipped with operation keys, a touch panel integrally composed with the display section 4, etc., and outputs operation signals according to operations of them to the control section 1. A user can input instructions as to the job setting, change of processing contents, etc. by using the operation section 3.

The display section 4 may be composed of a Liquid Crystal Display (LCD) or the like, and displays an operation screen and the like according to the instruction of the control section 1.

The communication section 5 communicates with a computer on a network, for example, a server or another image forming apparatus, according to the instruction from the control section 1.

The scanner 6 reads the image on the document, generates the image data for each of colors of Red (R), Green (G) and Blue (B) to output the image data to the image processing device 7.

The image processing device 7 corrects the image data input from the scanner 6 or the print controller G1, performs image processing to the image data, and then outputs the image data to the image forming section 8.

As illustrated in FIG. 2, the image processing device 7 includes a color converting section 71, a gradation correcting section 72, and a halftone processing section 73.

The color converting section 71 performs color conversion processing to the image data of each of colors of R, G and B output from the scanner 6, and outputs the image data of each of colors of C, M, Y and K.

The color converting section 71 can also perform color conversion processing to the image data of each of colors of C, M, Y and K output from the print controller G1 for color correction, and output the image data for each of colors of C, M, Y and K to which color correction has been performed.

The color converting section 71 uses the LUT in which each gradation value of each color of C, M, Y or K after color conversion is defined with respect to each gradation value of each color of R, G or B, when executing the color conversion processing. The color converting section 71 uses the LUT in which each gradation value of each color of C, M, Y or K after color correction is defined with respect to each gradation value of each color of C, M, Y or K, when executing the color correction.

The gradation correcting section 72 corrects a gradation of the image data output from the color converting section 71 or the print controller G1.

The gradation correcting section 72 uses the LUT in which a correction value corresponding to each gradation value is defined so that the gradation characteristic of the image matches a target gradation characteristic, when correcting the gradation. The gradation correcting section 72 obtains the correction value corresponding to the gradation value of each pixel of the image data from the LUT for the gradation correction, and outputs the image data composed of the corrected value.

The halftone processing section 73 performs halftone processing to the image data output from the gradation correcting section 72. The halftone processing includes, for example, screen processing using a dither matrix, error diffusion processing, and so on.

The halftone processing section 73 outputs the image data after halftone processing to the image forming section 8.

The image forming section 8 forms the image on the sheet on the basis of the image data output from the image processing device 7.

As illustrated in FIG. 1, the image forming section 8 includes four sets each including an exposing section 81, a photoreceptor 82 and a developing section 83 for the respective colors of C, M, Y and K. The image forming section 8 also includes an intermediate transfer belt 84, secondary transfer rollers 85, a fixing device 86 and a reversal mechanism 87.

The exposing section 81 is equipped with a Laser Diode (LD) as a light emitting element. The exposing section 81 drives the LD on the basis of the image data to expose the charged photoreceptor 82 by irradiating it with the laser light. The developing section 83 supplies toner on the photoreceptor 82 by the charged developing roller to develop an electrostatic latent image which has been formed on the photoreceptor 82 by exposure.

The images which have been thus formed with the toners of the respective colors on the four photoreceptors 82 are transferred onto the intermediate transfer belt 84 from each of the photoreceptors 82 so that they are sequentially superimposed on one another. By this, a color image is formed on the intermediate transfer belt 84. The secondary transfer roller 85 transfers this color image on the sheet fed from the feeding unit G2 or the feeding trays 31. The fixing device 86 performs fixing processing by applying heat and pressure to the sheet after transferring.

In the case of forming the images on both sides of the sheet, the image forming section 8 causes the reversal mechanism 87 to reverse a front side and a rear side of the sheet, and forms the image also on the rear side. The reversal mechanism 87 includes a conveyance path which reverses the front and rear sides of the sheet passing therethrough and conveys the sheet to the transferring position of the secondary transfer roller 85 again.

The reading section 9 reads the image formed on the sheet by the image forming section 8.

In order to suppress fluctuation of a height position of a surface of a sheet at the time of reading as much as possible, as illustrated in FIG. 1, a guide plate A of the sheet may be provided at a position opposite to the reading section 9 across the conveyance path of the sheet. It is also possible to provide guide plates E which are adjacent to the reading section 9 in a sheet conveyance direction and are opposite to the guide plate A across the conveyance path.

Figure 3:
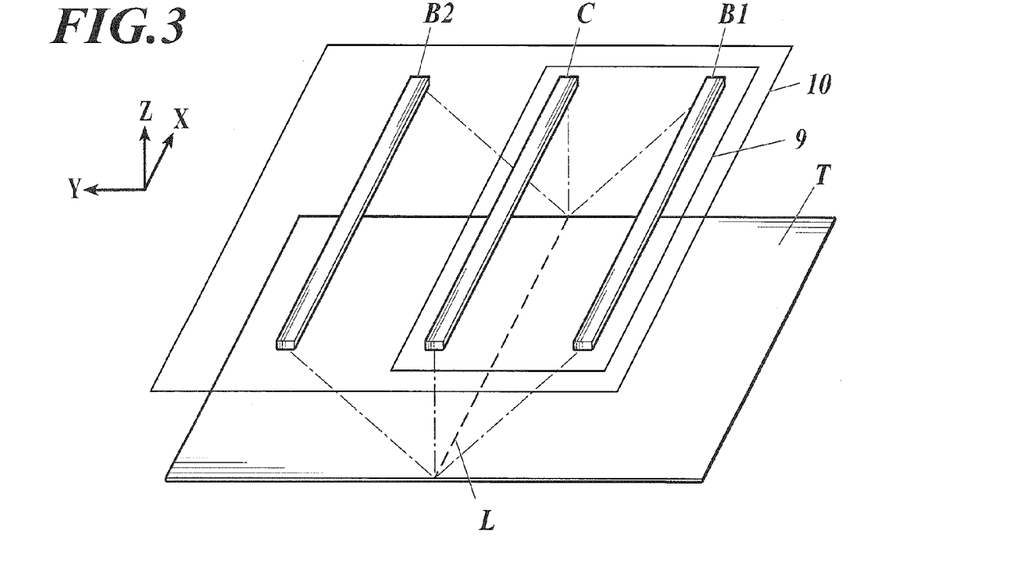
FIG. 3 is a perspective view illustrating a reading section and a measuring section of FIG. 1.

As illustrated in FIG. 3, the reading section 9 is equipped with a light source C and a color line sensor B1.

The light source C emits laser light, and the color line sensor B1 performs photoelectric conversion to the laser light reflected on the sheet surface. The color line sensor B1 outputs the signal values of the respective colors of R, G and B obtained by the photoelectric conversion, as the read values of the image.

The color line sensor B1 reads the image on the sheet T in one (1) line unit in a main scanning direction. The dotted line in FIG. 3 represents a reading position L of an one (1) line image by the line sensor B1. Because the sheet T is conveyed in a sub scanning direction Y, the color line sensor B1 is capable of reading a whole surface of the sheet T by repeating the reading operation.

The measuring section 10 measures the height position of the sheet surface at the reading position of the reading section 9.

The method for measuring the height position of the sheet surface is not limited particularly, and a stereo system using parallax, a Time Of Flight (TOF) system using a phase difference between measurement light and reflected light thereof, etc. may be used. As the measurement light, laser light, infrared light, etc. may be used.

An example where the measuring section 10 executes measurement by the stereo system will be hereinafter described.

As illustrated in FIG. 3, the measuring section 10 of the stereo system is configured to include a light source C and two color line sensors B1, B2, and further include a non-illustrated calculating section. The color line sensor B2 has the same configuration as that of the color one sensor B1.

The color line sensors B1, B2 are provided at a front position and a rear position in the sheet conveyance direction, respectively, with respect to the reading position L of the reading section 9. The sheet conveyance direction is same as the sub scanning direction Y.

Incidentally, the measuring section 10 may share the light source C and the color line sensor B1 with the reading section 9 as illustrated in FIG. 3 in order to reduce costs, or alternatively, may include the light source C and the two color line sensors provided separately from those of the reading section 9.

The measuring section 10 reads the images at the reading position L by the two color line sensors B1, B2, respectively. The measuring section 10 measures the height position of the sheet surface in a height direction Z on the basis of parallax which is misalignment between the two read images. The height direction Z is a direction perpendicular to a X-Y plane composed of the main scanning direction X and the sub scanning direction Y. The measuring section 10 measures the height position of the sheet surface with the surface of the guide plate A provided below the sheet T as a reference surface whose height position is zero (0). In the case that the guide plate A is not provided, the measuring section 10 may set a theoretical reference surface to measure the height position of the sheet surface with the height position of the theoretical reference surface as zero (0).

Figure 4:
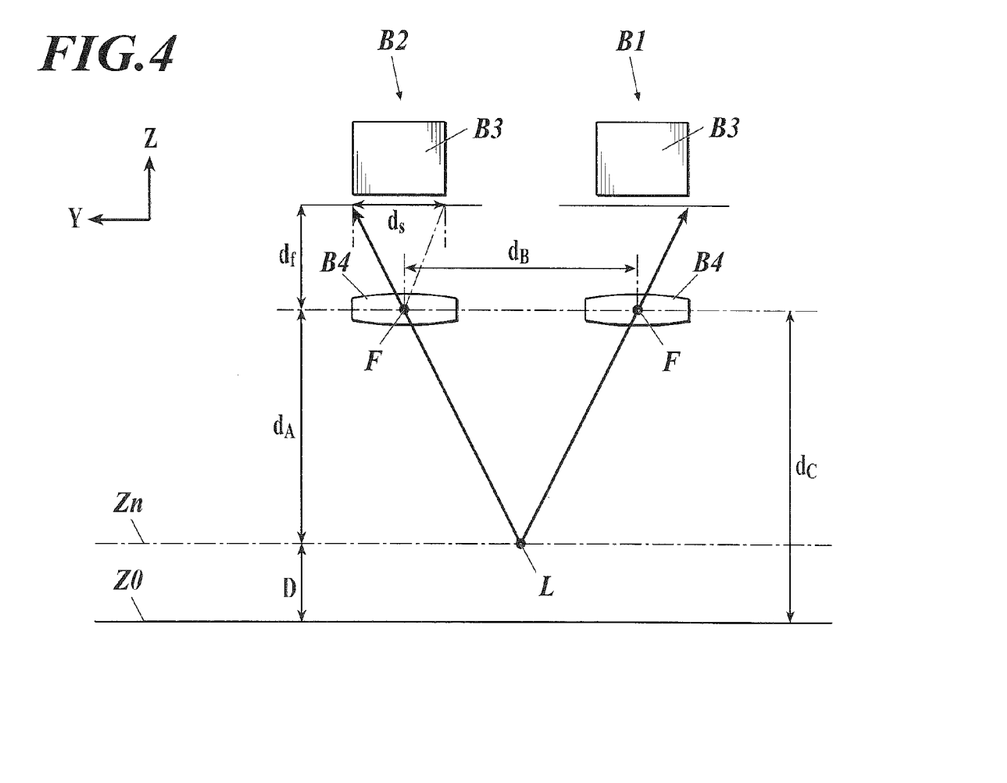
FIG. 4 is a front view illustrating color line sensors of FIG. 3 seen from a main scanning direction of a sheet.

FIG. 4 is a front view of the color line sensors B1, B2 seen from the main scanning direction X of the sheet.

As illustrated in FIG. 4, each of the color line sensors B1, B2 is equipped with an imaging sensor B3, and a lens B4 which forms an image of light from the reading position L on an imaging surface of the imaging sensor B3. The lenses B4 are arranged so as to be separated at an interval of a reference length $d_B$ on a surface where distances $d_C$ from a reference surface Z0 to focus positions F become equal.

Because the positions of the reference surface Z0, the imaging sensors B3 and the lenses B4 are fixed, the distance $d_C$, the reference length $d_B$ and a focal distance $d_f$ from each focus position F to the imaging surface are constant.

The measuring section 10 calculates, on the basis of the two images read by the imaging sensors B3, a parallax $d_s$ which is misalignment between the two images. The measuring section 10 calculates a distance $d_A$ from a sheet surface Zn to each focus position F by the following formula (1) by using the obtained parallax $d_s$.

$$d_A = d_B \cdot d_f / d_s \cdot \delta \quad (1)$$

Here, $\delta$ indicates a size of one (1) pixel of the imaging sensor.

The measuring section 10 calculates a distance D in the height direction Z from the reference surface Z0 to the sheet surface Zn at the reading position L by the following formula (2) by using the obtained distance $d_A$. The measuring section 10 outputs the obtained distance D as the height position of the sheet surface measured at the reading position L.

$$D = d_C - d_A \quad (2)$$

Figure 5:
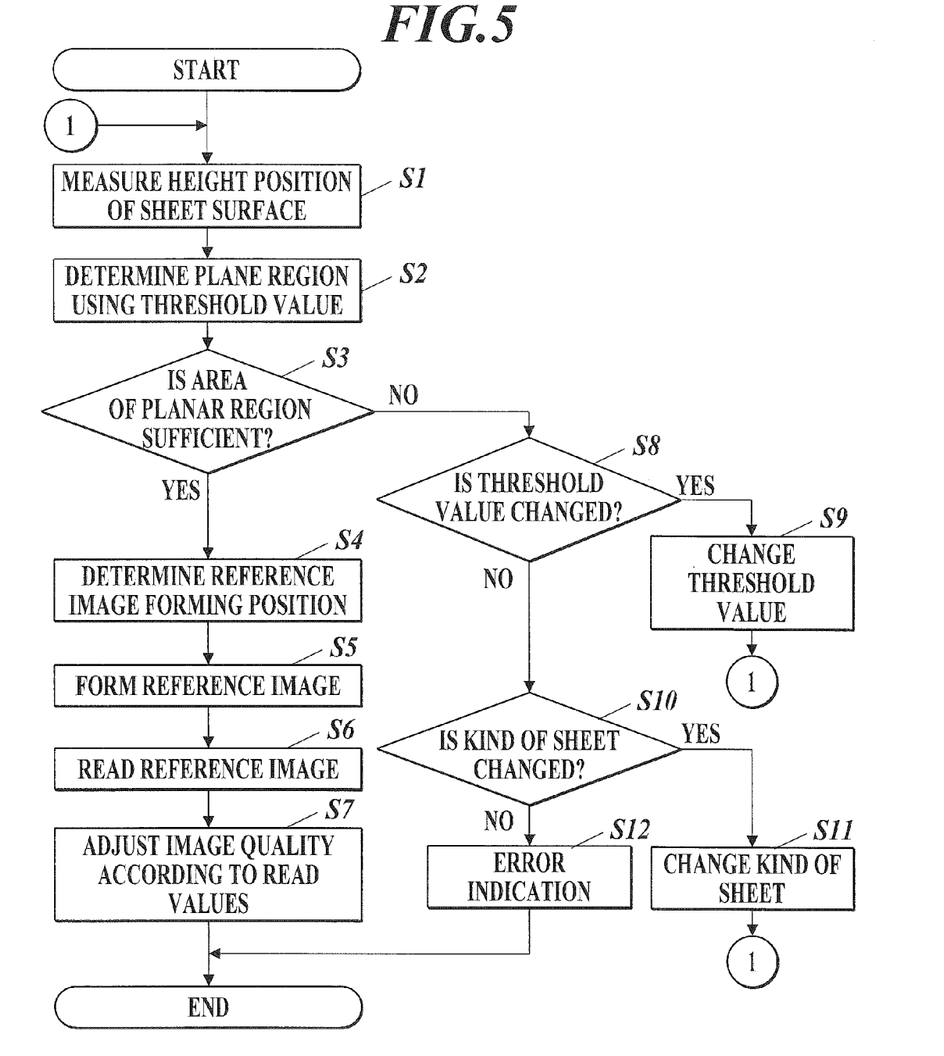
FIG. 5 is a flowchart illustrating operation procedures when the image forming apparatus according to this embodiment adjusts image quality.

FIG. 5 is a flowchart illustrating operation procedures when the image forming apparatus G adjusts image quality.

First, the control section 1 causes the feeding trays G31 or the feeding unit G2 to feed the same kind of sheet as the sheet on which the reference image is to be formed. Then, preferably, the control section 1 instructs the image forming section 8 to execute fixing processing, and the image forming section 8 performs fixing processing to the fed sheet. Thus the planar region can be determined in view of deformation property of the sheet, which deformation is caused by the fixing processing.

The control section 1 instructs the measuring section 10 to execute measurement, and the measuring section 10 measures the height position of the sheet surface after the fixing processing (Step S1).

The control section 1 then compares the measured height position of the sheet surface with a threshold value, and determines a region in which the height position of the sheet surface is equal to or less than the threshold value as the planar region of the sheet (Step S2).

For example, in the case that the threshold value is 0.5 mm, the control section 1 determines the region in which the measured height position is equal to or less than 0.5 mm as the planar region.

Figure 6:
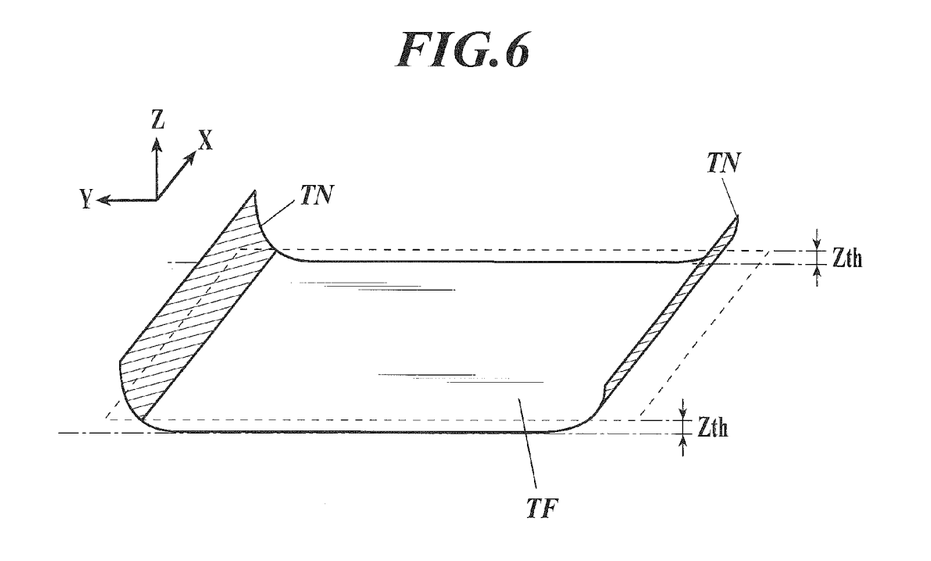
FIG. 6 is a perspective view illustrating a planar region of the sheet.

In the case of the sheet whose end portions are curling as illustrated in FIG. 6, a region TF in which the height position of the sheet surface is within a range from the reference surface to a threshold value Zth is determined as the planar region. The dotted lines in FIG. 6 represent the sheet surface when the height position is equal to the threshold value Zth.

On the other hand, the regions TN represented by slant lines are excluded from the planar region because the height position of the sheet surface becomes higher than the threshold value Zth in the regions TN.

The control section 1 judges whether or not an area of the determined planar region is a sufficient area for forming the reference image (Step S3).

For example, in the case that the reference image can be well formed within the planar region when the area of the planar region is equal to or more than 50% of the entire sheet, the control section 1 sets the threshold value to 50%, and judges whether or not the area of the planar region is equal to or more than 50% of the area of the entire sheet.

The planar region is not limited to a single region, and may be separated into a plurality of regions. In this case, the control section 1 judges whether or not an area of all planar regions, which is the sum of the areas of the plural planar regions, is equal to or more than the threshold value.

The sufficient area for forming the reference image differs depending on the kind of the reference image.

For example, when adjusting the maximum density as the image quality by changing the image forming condition, a plurality of solid patches in which gradation values are set to maximum are formed as the reference images according to the image forming conditions (for example, a bias voltage applied to the developing roller, a laser power of the exposing section 81, etc.) different from one another.

When adjusting color or gradation reproductivity as the image quality by updating the LUT used for color conversion or gradation correction, a single color patch and a second color patch are used as the reference images.

Figure 7A:
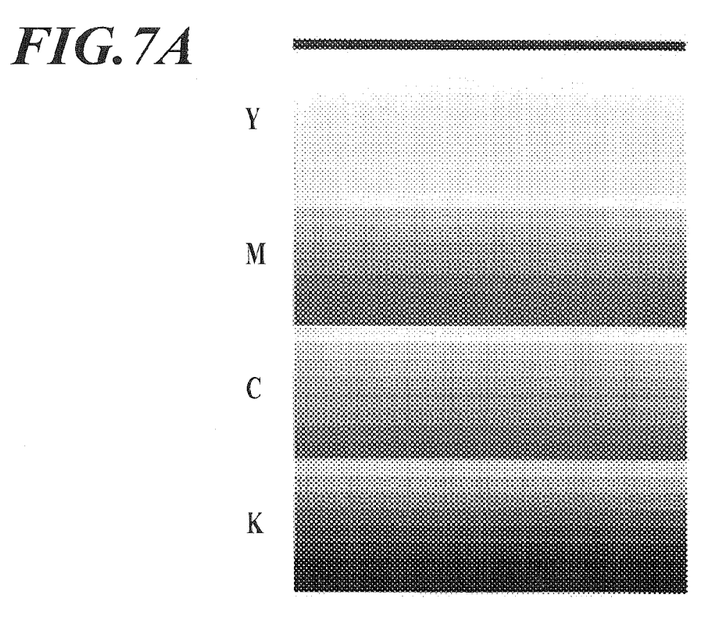
FIG. 7A illustrates an example of a single color patch used as a reference image when updating an LUT for gradation correction.
Figure 7B:
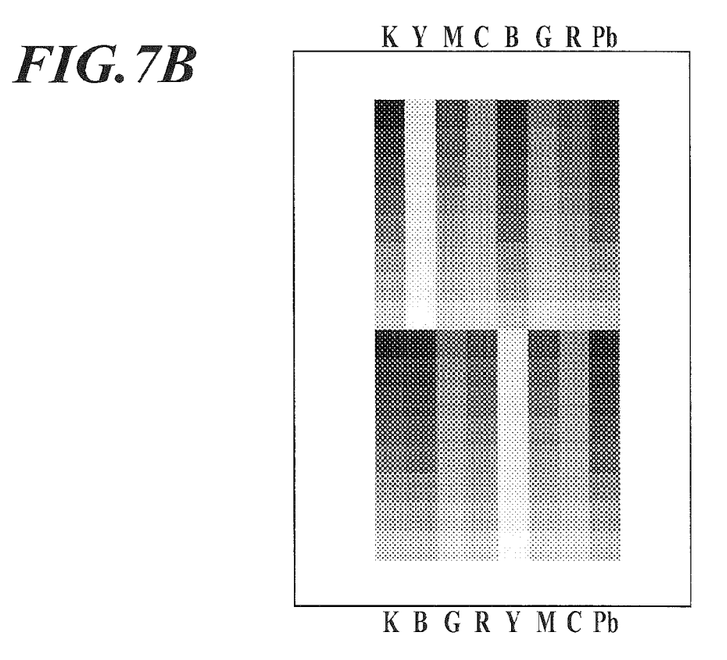
FIG. 7B illustrates an example of a second color patch used as the reference image when updating the LUT for gradation correction.

FIG. 7A illustrates an example of the single color patch for gradation correction, and FIG. 7B illustrates an example of the second color patch for gradation correction. The single color patch includes a plurality of patches, in each of which gradation values of each single color of Y, M, C or K gradually vary. The second color patch includes a plurality of patches, in each of which gradation values of each second color of K, Y, M, C, B, G, R or Pb gradually vary.

Figure 8A:
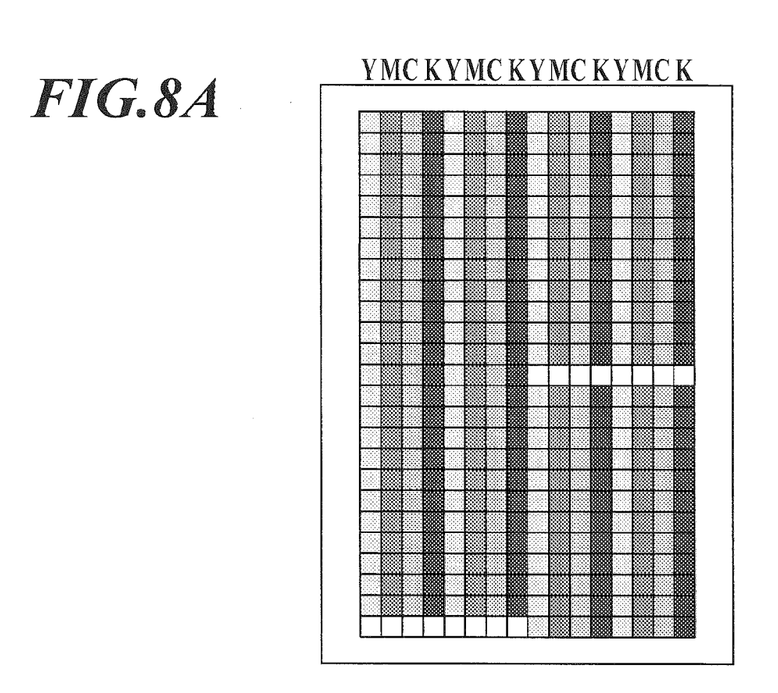
FIG. 8A illustrates an example of a single color patch used as a reference image when updating an LUT for color conversion.
Figure 8B:
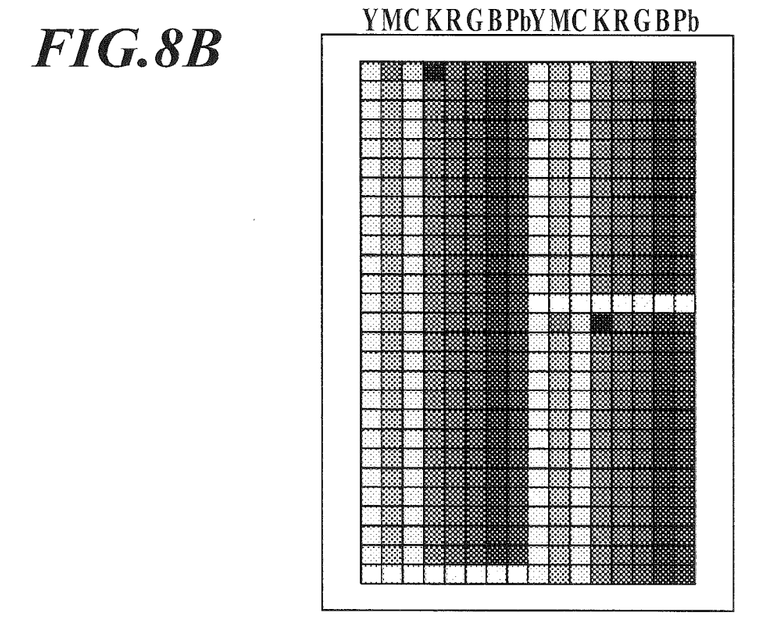
FIG. 8B illustrates an example of a second color patch used as the reference image when updating the LUT for color conversion.

FIG. 8A illustrates an example of a single color patch for color conversion, and FIG. 8B illustrates an example of a second color patch for color conversion. The single color patch includes patches of each single color of Y, M, C or K, and the second color patch includes patches of each second color of Y, M, C, K, R, G, B or Pb. In each of the single color patch and the second color patch, the plural patches of the same color are arranged in a line.

Because the number of patches differs depending on the kind of the reference image as described above, also the sufficient area for forming all of the patches varies. In order to deal with this, the storage section 2 may store the sufficient areas for forming the reference image, which have previously been obtained for every kinds of the reference image, as threshold values, and the control section 1 may read out the threshold value corresponding to the reference image to be formed from the storage section 2 to use the read threshold value for comparison.

When the area of the planar region is sufficient for forming the reference image (Step S3; Y), the control section 1 determines a forming position of a reference image within the planar region (Step S4).

The reference image may also be formed so as to be divided into plural images. In the case that the planar region is not one (1) and divided into the plural planar regions, the control section 1 may assign the forming positions of the reference images to the planar regions, respectively, to determine the forming positions.

Figure 9:
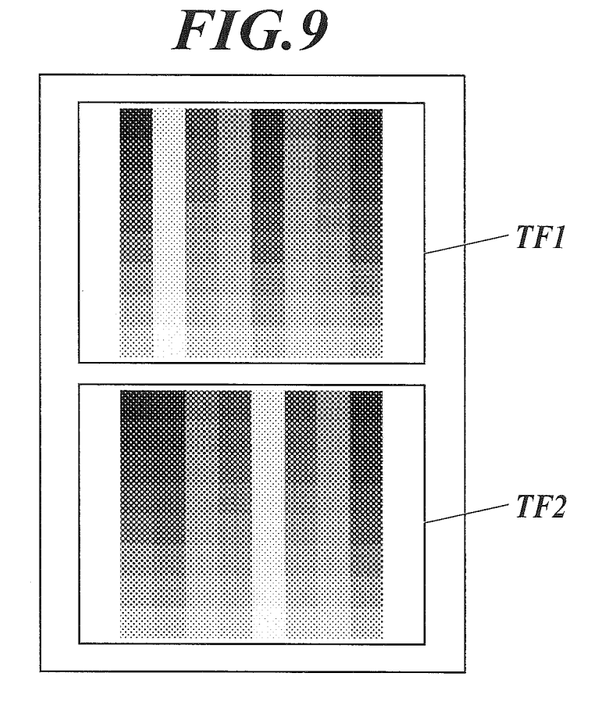
FIG. 9 illustrates examples of reference images formed in two planar regions of the sheet, respectively.

For example, when forming the reference image of the second color patch illustrated in FIG. 7B in two planar regions, the control section 1 divides the second color patch into two parts of an upper part and a lower part according to the areas of the two planar regions. The control section 1 then determines the forming positions of the divided second color patches in the two planar regions TF1, TF2, respectively, as illustrated in FIG. 9.

Next, the control section 1 causes the feeding trays G31 or the feeding unit G2 to feed next sheet, and instructs the image forming section 8 to form the reference image. The image forming section 8 forms the reference image at a position on the fed sheet corresponding to the forming position determined by the control section 1 (Step S5). The control section 1 then instructs the reading section 9 to read the reference image, and the reading section 9 reads the reference image formed on the sheet (Step S6).

The control section 1 obtains the read values from the reading section 9, adjusts the image quality according to the read values (Step S7), and terminates this processing.

For example, in the case that the reference image is the solid patch for maximum density adjustment, the control section 1 specifies the solid patch by which the read value agrees with the target value. The control section 1 changes the image forming condition such as the bias voltage and the laser power in the image forming section 8 to the image forming condition at the time of forming the specified solid patch.

In the case that the reference image is the single color patch and/or the second color patch, the control section 1 newly creates the LUT to be used for color conversion or gradation correction depending on a difference between the read value from each patch and the target value.

On the other hand, when the determined planar region does not have the sufficient area for forming the reference image (Step S3; N), the control section 1 causes the display section 4 to display an operation screen on which the threshold value to be used for determining the planar region can be changed. The larger the threshold value is, the more easily the area of the planar region increases. Accordingly, execution of image quality adjustment becomes easy, but variation of the height position of the sheet surface easily becomes large. When giving more priority to execution of image quality adjustment than accuracy of image quality adjustment, a user may significantly change the threshold value.

When a user inputs the instruction to change the threshold value via the operation section 3 (Step S8; Y), the control section 1 changes the threshold value, which is used for determining the planar region, to the threshold value instructed by the user (Step S9). After that, the processing returns to Step S1 and the above-described processes are repeated, thereby the planar region is redetermined by using the new threshold value.

When a user inputs the instruction not to change the threshold value via the operation section 3 (Step S8; N), the control section 1 causes the display section 4 to display an operation screen on which the kind of sheet to be used for forming the reference image can be changed. In the case of the sheet having little irregularities on the surface thereof and/or the sheet unlikely to produce curl/waving, the height position of the sheet surface does not vary very much. When a user selects such sheet, the area of the planar region easily increases, and the image quality can be adjusted accurately.

When a user inputs the instruction to change the kind of the sheet via the operation section 3 (Step S10; Y), the control section 1 changes the sheet, which is used for forming the reference image, to the kind of the sheet instructed by the user (Step S11). After that, the processing returns to Step S1 and the above-described processes are repeated, thereby the planar region is redetermined by using the new kind of the sheet.

When a user inputs the instruction not to change the kind of the sheet via the operation section 3 (Step S10; N), the control section 1 causes the display section 4 to display an error indication screen to inform a user the fact that image quality adjustment cannot be performed (Step S12), and terminates this processing.

As described above, according to this embodiment, the image forming apparatus includes: the measuring section 10 which measures the height position of the sheet surface at the reading position L at which the reference image for image quality adjustment is read; the control section 1 which determines the planar region of the sheet according to the measured height position, and determines the reference image forming position within the planar region; the image forming section 8 which forms the reference image at the position of the sheet according to the determined forming position, the sheet being newly fed after determining the forming position; and the reading section 9 which reads the reference image at the reading position L. The control section 1 adjusts the image quality by using the read values of the reference image which have been obtained by the reading section 9.

By this, the read values of the reference image formed within the planar region of the sheet can be obtained. Because the height position of the sheet surface does not vary very much within the planar region, the read values do not vary very much and accuracy of reading of the reference image is improved.

Because accuracy of reading of the reference image is improved, image quality adjustment can be performed accurately.

[Another Embodiment]

According to the above embodiment, the image forming apparatus G firstly determines the planar region, and then forms the reference image within the planar region and reads the reference image.

On the other hand, according to another embodiment, the image forming apparatus may firstly form the reference image, then determine the planar region of the sheet on which the reference image has been formed, and read the reference image formed within the planar region.

The image forming apparatus according to another embodiment may be implemented by changing the operation procedures of image quality adjustment by the above image forming apparatus G, as described below.

Figure 10:
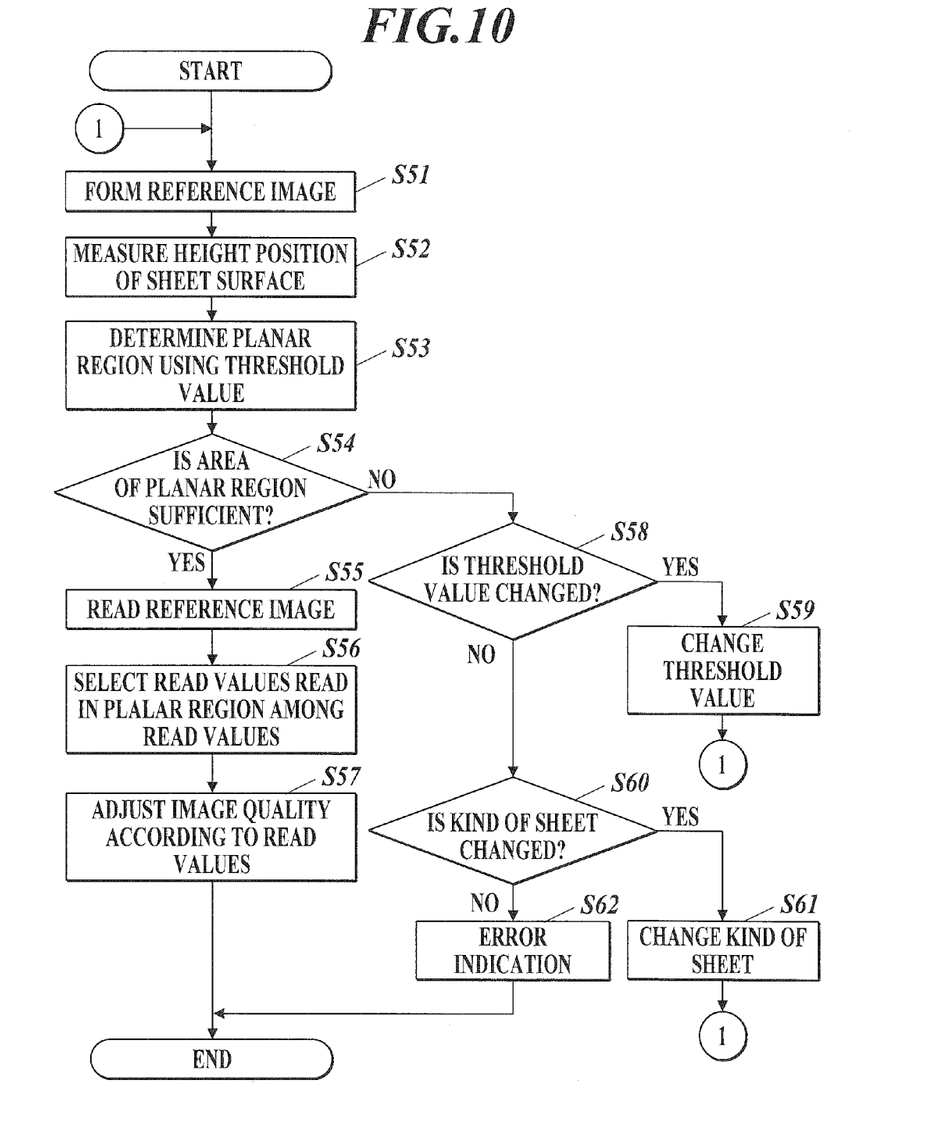
FIG. 10 is a flowchart illustrating operation procedures when the image forming apparatus according to another embodiment adjusts image quality.

FIG. 10 is a flowchart illustrating operation procedures of image quality adjustment by the image forming apparatus G according to another embodiment.

As illustrated in FIG. 10, the control section 1 causes the feeding trays G31 or the feeding unit G2 to feed the sheet to be used for forming the reference image, and instructs the image forming section 8 to form the reference image. The image forming section 8 forms the reference image on the fed sheet and performs fixing processing to the sheet (Step S51).

The image forming section 8 preferably forms a plurality of same reference images at different positions on one (1)

sheet. By this, the area of the reference images formed within the planar region becomes large, and the read values to be used for image quality adjustment are easily obtained.

The image forming section 8 may also form a job image within an image region of the sheet, and form the reference image within a non-image region of the sheet. By this, the read values of the reference image can be obtained also during job execution, and processing becomes efficient. Additionally, because a waste sheet on which only the reference image is formed is not produced, costs can be reduced.

The non-image region is a region where formation of the job image is invalid, and provided in an end portion of the sheet. The reference image thus formed in the non-image region is generally called as a control slip.

The control section 1 instructs the measuring section 10 to perform measurement, and the measuring section 10 measures the height position of the sheet surface on which the reference image has been formed (Step S52).

The control section 1 compares the measured height position of the sheet surface with the threshold value, and determines the planar region of the sheet (Step S53). Because the processing to determine the planar region is same as Step S2 in FIG. 5, a detailed description thereof is omitted.

Then, the control section 1 judges whether or not the determined planar region has a sufficient area for obtaining the read values of the reference image (Step S54).

For example, in the case that one (1) reference image occupies at least 50% of the area of the entire sheet, in order to obtain the read values from the reference image within the planar region, the planar region needs to have an area equal to or more than at least 50% of the area of the entire sheet. For this reason, the control section 1 judges whether or not the area of the determined planar region is equal to or more than 50% of the entire sheet.

The sufficient area for obtaining the read values from the reference image varies depending on the kind of the reference image. In order to deal with this, the storage section 2 may store the sufficient areas for obtaining the read values from the reference image, which have previously been obtained depending on the kinds of the reference images, as threshold values, and the control section 1 may read out the area corresponding to the kind of the reference image from the storage section 2 to use the read area for comparison.

Meanwhile, the control section 1 instructs the reading section 9 to execute reading. The reading section 9 reads the reference image (Step S55). When the planar region has the sufficient area for obtaining the read values from the reference image (Step S4; Y), the control section 1 selects the read values of the reference image which are formed within the planar region, among the read values obtained by the reading section 9 (Step S56).

Figure 11:
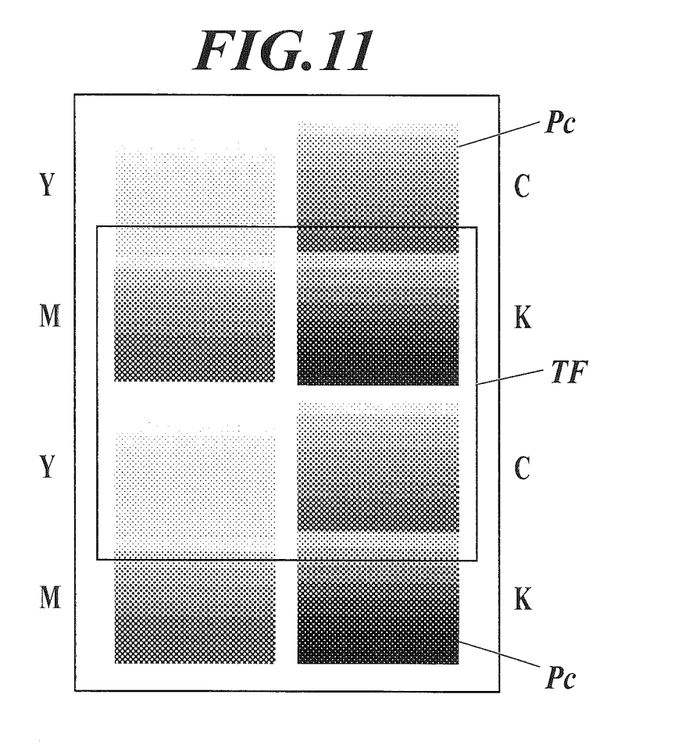
FIG. 11 is a diagram illustrating the planar region of the sheet on which reference images are formed.

For example, as illustrated in FIG. 11, in the case that two same single color patches Pc for gradation correction are formed on one (1) sheet as the reference images, two read values are obtained for one (1) gradation value because there are two patches of the same gradation values. However, in the single color patch Pc formed in the upper part of the sheet, only patches of colors of M and K are formed within the planar region TF, and in the single color patch Pc formed in the lower part of the sheet, only patches of colors of C and Y are formed within the planar region TF. The control section 1 selects the read values of the patches of M and K from among the read values of the single color patch Pc formed in the upper part of the sheet, and selects the read values of the patches of C and Y from among the read values of the single color patch Pc formed in the lower part of the sheet.

The control section 1 adjusts the image quality according to the selected read values (Step S57), and terminates this processing. Because the content of image quality adjustment is same as the processing content of Step S7 in FIG. 5, the description thereof is omitted.

On the other hand, when the determined planar region does not have the sufficient area for obtaining the read values from the reference image (Step S54; N), the control section 1 causes the display section 4 to display the operation screen on which the threshold value to be used for determining the planar region can be changed.

When a user inputs the instruction to change the threshold value via the operation section 3 (Step S58; Y), the control section 1 changes the threshold value, which is used for determining the planar region, to the threshold value instructed by the user (Step S59). After that, the processing returns to Step S51 and the above processes are repeated, and the planar region is redetermined by using the new threshold value.

When a user inputs the instruction not to change the threshold value via the operation section 3 (Step S58; N), the control section 1 causes the display section 4 to display the screen on which the kind of sheet to be used for formation of the reference image can be changed.

When a user inputs the instruction to change the kind of the sheet via the operation section 3 (Step S60; Y), the control section 1 changes the sheet, which is used for formation of the reference image, to the kind of the sheet instructed by the user (Step S61). After that, the processing returns to Step S51 and the above processes are repeated, and the planar region is redetermined by using the new kind of the sheet.

When a user inputs the instruction not to change the kind of the sheet via the operation section 3 (Step S60; N), the control section 1 causes the display section 4 to display an error indication screen to inform a user that image quality adjustment cannot be performed (Step S62), and terminates this processing.

As described above, according to another embodiment, the image forming apparatus includes: the image forming section 8 which forms the reference image for image quality adjustment on the sheet; the reading section 9 which reads the reference image; the measuring section 10 which measures the height position of the sheet surface, on which the reference image is formed, at the reading position of the reading section 9; and the control section 1 which determines the planar region of the sheet, on which the reference image is formed, according to the height position, and adjusts image quality by using the read values of the reference image formed within the planar region among the read values obtained by the reading section 9.

By this, the read values of the reference image formed within the planar region of the sheet can be obtained. Because the height position of the sheet surface does not vary very much within the planar region, the read values do not vary very much and accuracy of reading of the reference image is improved.

Because accuracy of reading of the reference image is improved, image quality adjustment can be performed accurately.

The above embodiments are preferred examples of the present invention, and the present invention is not limited to the embodiments. The detailed configurations/operations can be arbitrary changed within the range not departing from the spirit of the present invention.

For example, as a computer readable medium storing programs executed by the control section 1, a non-volatile memory such as a ROM and a flash memory, and a portable recording medium such as a CD-ROM can be applied. Also carrier wave can be applied as a medium that provides program data via a communication line.

The present U.S. patent application claims a priority under the Paris Convention of Japanese patent application No. 2013-084693 filed on Apr. 15, 2013, in which all contents of this application are disclosed, and which shall be a basis of correction of an incorrect translation.

What is claimed is:

1. An image forming apparatus comprising:
a measuring section which measures a height position of a surface of a sheet at a reading position at which a reference image for image quality adjustment is read;
a control section which determines a planar region of the sheet according to the height position, and determines a forming position of the reference image within the planar region;
an image forming section which forms the reference image at a position of a sheet corresponding to the forming position, the sheet being newly fed after determination of the forming position;
a reading section which reads the reference image at the reading position, wherein the control section adjusts image quality by using a read value obtained from the reference image by the reading section; and
an operation section
wherein the control section determines, as the planar region, a region in which the height position is equal to or less than a threshold value;
wherein the control section changes the threshold value to a threshold value instructed by a user via the operation section.

2. An image forming apparatus comprising:
a measuring section which measures a height position of a surface of a sheet at a reading position at which a reference image for image quality adjustment is read;
a control section which determines a planar region of the sheet according to the height position, and determines a forming position of the reference image within the planar region;
an image forming section which forms the reference image at a position of a sheet corresponding to the forming position, the sheet being newly fed after determination of the forming position;
a reading section which reads the reference image at the reading position, wherein the control section adjusts image quality by using a read value obtained from the reference image by the reading section; and
an operation section,
wherein the control section changes the sheet to be used for forming the reference image to a kind of a sheet instructed by a user via the operation section.

3. An image forming apparatus comprising:
a measuring section which measures a height position of a surface of a sheet at a reading position at which a reference image for image quality adjustment is read;
a control section which determines a planar region of the sheet according to the height position, and determines a forming position of the reference image within the planar region;
an image forming section which forms the reference image at a position of a sheet corresponding to the forming position, the sheet being newly fed after determination of the forming position; and
a reading section which reads the reference image at the reading position, wherein the control section adjusts image quality by using a read value obtained from the reference image by the reading section;
wherein the measuring section includes two color line sensors which are provided at a front position and a rear position in a sheet conveyance direction with respect to the reading section, respectively.

* * * * *